(12) United States Patent
Calugaru et al.

(10) Patent No.: US 12,639,960 B2
(45) Date of Patent: May 26, 2026

(54) METHOD FOR ASCERTAINING A POSITION OF A VEHICLE WITHIN A LANE

(71) Applicant: Robert Bosch GmbH, Stuttgart (DE)

(72) Inventors: Andrei Calugaru, Cluj-Napoca (RO); Mihai Negru, Cluj-Napoca (RO); Vlad-Laviniu Ghete, Cluj-Napoca (RO)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/825,546

(22) Filed: Sep. 5, 2024

(65) Prior Publication Data

US 2025/0095386 A1     Mar. 20, 2025

(30) Foreign Application Priority Data

Sep. 19, 2023     (DE) ...................... 10 2023 209 059.7

(51) Int. Cl.
*G06V 20/56*     (2022.01)

(52) U.S. Cl.
CPC ................................. *G06V 20/588* (2022.01)

(58) Field of Classification Search
CPC ....................................................... G06V 20/588
See application file for complete search history.

(56) References Cited

U.S. PATENT DOCUMENTS

2019/0371179 A1* 12/2019 Christen ................ G06V 20/52

* cited by examiner

*Primary Examiner* — On S Mung

(74) *Attorney, Agent, or Firm* — NORTON ROSE FULBRIGHT US LLP

(57) ABSTRACT

A method for ascertaining a position of a vehicle within a lane. The method includes: providing image data, wherein the image data result from a recording by at least one camera of the vehicle; analyzing the image data in order to determine a width of the lane and a distance of the vehicle to a nearest boundary of the lane; determining at least two sub-lanes in the lane based on the determined width of the lane and the nearest boundary of the lane; ascertaining the position of the vehicle with respect to one of the at least two determined sub-lanes based on the width of the lane and the distance of the vehicle to the nearest boundary of the lane. A computer program, a device, and a storage medium are also described.

8 Claims, 6 Drawing Sheets

METHOD FOR ASCERTAINING A POSITION OF A VEHICLE WITHIN A LANE

CROSS REFERENCE

The present application claims the benefit under 35 U.S.C. § 119 of German Patent Application No. DE 10 2023 209 059.7 filed on Sep. 19, 2023, which is expressly incorporated herein by reference in its entirety.

FIELD

The present invention relates to a method for ascertaining a position of a vehicle within a lane. The present invention furthermore relates to a computer program, a device, and a storage medium for this purpose.

BACKGROUND INFORMATION

When riding a motorcycle, it may in particular be important to take various preventative measures to ensure safe riding. One of these measures is, for example, the choice of lane position so that the rider of the motorcycle can avoid possible hazards such as obstacles, sections of road with low friction, or preceding vehicles. Furthermore, the choice of position within the lane may also be important when driving in groups. For example, on group rides, there are various formations that ensure safe riding. This formation can be maintained by knowing the position of the motorcycle in the lane. Furthermore, the choice of lane position may be relevant in the context of cornering in order to find a safe way to enter the curve.

However, current lane recognition solutions are mostly only geared toward motor-vehicle-based solutions and in particular do not take into account parts of a lane depending on the size of the vehicle.

SUMMARY

The present invention provides a method, a computer program, a device, and a computer-readable storage medium, for ascertaining a position of a vehicle within a lane. Further features of and details relating to the present invention can be found in the disclosure herein. Features and details which are described in connection with the method according to the present invention of course also apply in connection with the computer program according to the present invention, the device according to the present invention, and the computer-readable storage medium according to the present invention, and respectively vice versa, so that, with respect to the disclosure, mutual reference is or can be made to the individual aspects of the present invention at all times.

The present invention relates in particular to a method for ascertaining a position of a vehicle within a lane. According to an example embodiment of the present invention, the method includes the following steps:

providing image data, wherein the image data result from a recording by at least one camera of the vehicle, analyzing the image data in order to determine a width of the lane and a distance of the vehicle to a nearest boundary of the lane, determining at least two sub-lanes in the lane on the basis of the determined width of the lane and the nearest boundary of the lane, ascertaining the position of the vehicle with respect to one of the at least two determined sub-lanes on the basis of the width of the lane and the distance of the vehicle to the nearest boundary of the lane.

The lane is in particular a lane in which the vehicle is currently driving. The vehicle is preferably a two-wheeler, such as a motorcycle. It is also possible that the vehicle is a bicycle. The nearest boundary is nearest in particular with respect to the vehicle. If there is more than one boundary, it is possible to first ascertain a distance of the vehicle to all boundaries and to subsequently determine the nearest boundary therefrom. The boundary of the lane may be a marking and/or a road edge, or roadway edge, and/or an obstacle, such as a wall or a guardrail. The analysis of the image data can be carried out using various conventional image recognition methods, for example by applying a machine learning model such as a convolutional neural network. For ascertaining the distance of the vehicle to the nearest boundary, it may be provided that 3D coordinates for the image data are provided in order to determine the distance to the nearest boundary on the basis of depth information of the 3D coordinates. It is also possible that the distance to the nearest boundary is determined by a calculation on the basis of the relative sizes of objects in the image data to one another, for example on the basis of the width of the lane and a known position of the camera in the vehicle. A width of the at least two sub-lanes can be ascertained on the basis of the width of the lane; for example, the width of the lane is halved in order to provide the two sub-lanes in each case as half of the lane, or is divided into thirds if three sub-lanes are provided. The method may be advantageous since it makes differentiated determination of the position of the vehicle in the lane possible. It may be provided that ascertaining the position of the vehicle is carried out at regular intervals in order to be able to advantageously provide an update of the position and a tracking of the position along a route.

Furthermore, it is possible that at least three sub-lanes are determined in the lane, wherein the at least three sub-lanes preferably have the same width. The at least three sub-lanes may, for example, be divided into a left, a middle and a right sub-lane, wherein the left, middle and right sub-lanes each, for example, make up one third of the width of the lane. By determining at least three sub-lanes, a more differentiated determination of the position of the vehicle can take place. Furthermore, three sub-lanes may be advantageous for analyzing various driving scenarios of the vehicle, especially in the case of a motorcycle. It is also possible that a division into more than three lanes takes place.

In a further possibility, according to an example embodiment of the present invention, it may be provided that the method furthermore comprises at least one of the following steps:

detecting at least one boundary of the lane on the basis of the analysis of the image data, defining the width of the lane on the basis of a specification if only one boundary of the lane has been detected, calculating the width of the lane on the basis of the analysis of the image data if two boundaries of the lane have been detected.

The specification may, for example, be a value for the width in a particular country, for example 3.5 meters. The specification may accordingly depend on a country or region in which the vehicle is located. Advantageously, as a result of the specification, the method can also be carried out with only a single boundary of the lane. The detection of at least one boundary of the lane can take place continuously or at defined intervals.

Further advantageously, according to an example embodiment of the present invention, it may be provided that the method furthermore comprises the following steps:

ascertaining a recommended sub-lane on the basis of an analysis of the image data with regard to a current driving scenario, initiating an outputting of a warning to a driver of the vehicle if the vehicle is in a sub-lane other than the recommended sub-lane, wherein the warning preferably indicates the recommended sub-lane.

It is also possible to ascertain multiple recommended sub-lanes. For example, both a right and a left sub-lane might be the recommended sub-lane, while a middle sub-lane might pose a risk to the driver of the vehicle. For example, the current driving scenario may be the vehicle driving behind a passenger car so that the recommended sub-lane is, for example, the right or left of three sub-lanes. Furthermore, the current driving scenario may also be driving through a curve, in which case the recommended sub-lane may be an outer sub-lane. By outputting the warning to the driver of the vehicle, the driver can advantageously respond and steer the vehicle into the recommended sub-lane. It is thus possible to avoid dangers that can occur if the vehicle is in a wrong position within the lane.

Within the scope of the present invention, it may be provided that the warning is output visually and/or acoustically in a human-machine user interface. For example, the human-machine user interface may comprise a display for providing the visual output of the warning. It is also possible that the acoustic output to the driver takes place via a loudspeaker of the human-machine user interface or, for example, via a Bluetooth connection via headphones.

A further advantage within the scope of the present invention can be achieved if the method furthermore comprises the following step:

ascertaining a free space in front of the vehicle in the lane on the basis of the analysis of the image data.

In this case, the recommended sub-lane can be ascertained taking into account the ascertained free space in front of the vehicle. This may be advantageous since possible obstacles or objects in the lane can be detected by ascertaining the free space. For example, there may be an oil stain or a vehicle part such as a tire in a left sub-lane, so that another sub-lane, such as the middle and/or right sub-lane, is the recommended sub-lane.

According to a further possibility of the present invention, it may be provided that the recommended sub-lane is furthermore ascertained taking into account a current velocity of the vehicle. By additionally taking into account the current velocity, a more differentiated analysis can advantageously take place with respect to the recommended sub-lane. The current velocity can be provided by sensor data from a sensor on the vehicle or can be ascertained on the basis of the image data.

It is possible for the method according to the present invention to be used in a vehicle. The vehicle may, for example, be designed as a motorcycle or a motor vehicle. The vehicle may comprise a vehicle mechanism, for example for providing an autonomous driving function and/or a driver assistance system. The vehicle mechanism may be designed to at least partially automatically control and/or accelerate and/or brake and/or steer the vehicle.

The image data can result from a capture by means of a camera sensor. In this case, the values of image points, preferably pixels, of the image data can represent an environment and/or a traffic scene. By classifying and preferably classifying images on the basis of these values, any objects in the environment and/or the traffic scene can be detected. The classification and image classification may also be provided in the form of a semantic segmentation (i.e., a pixel-wise or region-wise classification) and/or an object detection. The image data may also, for example, be images from a radar sensor and/or an ultrasonic sensor and/or a LiDAR sensor and/or a thermal imaging camera. Accordingly, the images can also be designed as radar images and/or ultrasound images and/or thermal images and/or lidar images.

The present invention also relates to a computer program, in particular a computer program product, comprising commands which, when the computer program is executed by a computer, cause the computer to carry out the method according to the present invention. The computer program according to the present invention thus delivers the same advantages as have been described in detail with reference to a method according to the present invention.

The present invention also relates to a device for data processing that is configured to carry out the method according to the present invention. For example, a computer which executes the computer program according to the present invention can be provided as the device. The computer can have at least one processor for executing the computer program. A non-volatile data memory can also be provided, in which the computer program is stored and from which the computer program can be read by the processor for execution.

The present invention can also relate to a computer-readable storage medium which comprises the computer program according to the present invention and/or commands which, when executed by a computer, cause the computer to carry out the method according to the present invention. The storage medium is formed, for example, as a data memory such as a hard drive and/or a non-volatile memory and/or a memory card. The storage medium can be integrated into the computer, for example.

Furthermore, the method according to the present invention can also be carried out as a computer-implemented method.

Further advantages, features and details of the present invention can be found in the following description, in which exemplary embodiments of the present invention are described in detail with reference to the figures. The features mentioned in the disclosure can be essential to the present invention, individually or in any combination.

DETAILED DESCRIPTION OF EXAMPLE EMBODIMENTS

Figure 1:
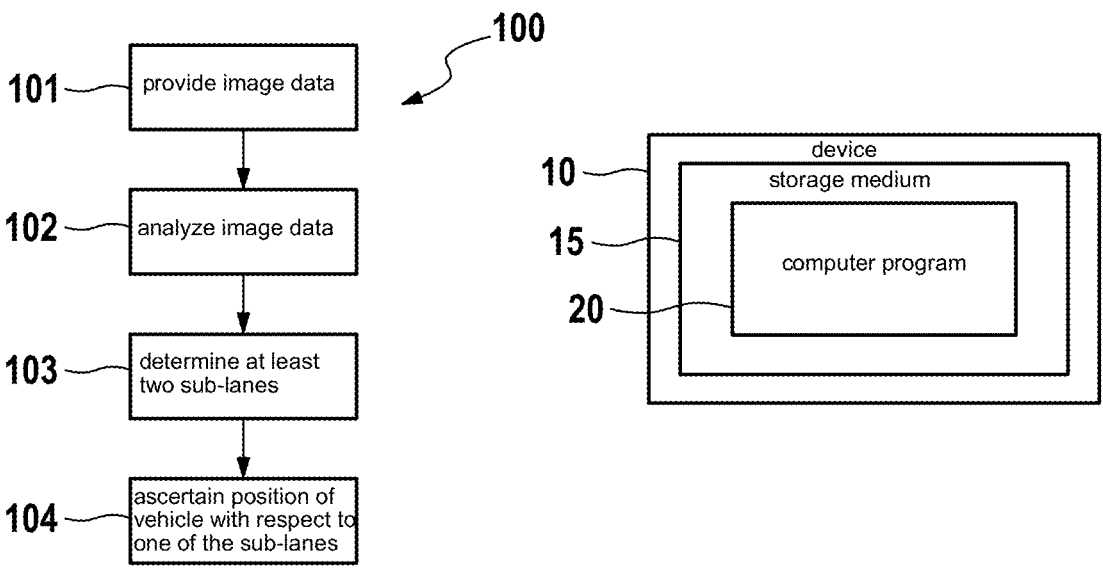
FIG. 1 shows a schematic visualization of a method, a device, a storage medium and a computer program according to exemplary embodiments of the present invention.

FIG. 1 schematically shows a method 100, a device 10, a storage medium 15, and a computer program 20 according to exemplary embodiments of the present invention.

FIG. 1 in particular shows a method 100 for ascertaining a position of a vehicle 1 within a lane 2 according to exemplary embodiments of the present invention. In a first step 101, image data are provided, wherein the image data result from a recording by at least one camera 3 of the vehicle 1. In a second step 102, the image data are analyzed in order to determine a width of the lane 2 and a distance of the vehicle 1 to a nearest boundary of the lane 2. In a third step 103, at least two sub-lanes 4 in the lane 2 are determined on the basis of the determined width of the lane 2 and the nearest boundary of the lane 2. In a fourth step 104, the position of the vehicle 1 with respect to one of the at least two determined sub-lanes 4 is ascertained on the basis of the width of the lane 2 and the distance of the vehicle 1 to the nearest boundary of the lane 2.

Figure 2:
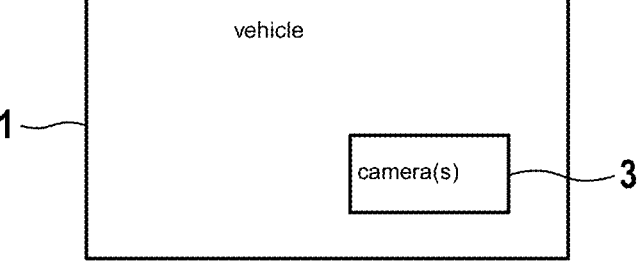
FIG. 2 shows a schematic representation of a vehicle with a camera according to exemplary embodiments of the present invention.

FIG. 2 schematically shows a vehicle 1 with a camera 3 according to exemplary embodiments of the present invention.

Lanes 2 and roadway edges can be recognized by means of algorithms using appropriate video sensors. On this basis, the position in the lane 2 can subsequently be ascertained. In particular, this furthermore makes it possible to recognize the ego lane. The ego lane is preferably the lane 2 on which the vehicle 1, in particular the motorcycle 1, is driven/ridden.

When riding a motorcycle, the rider must in particular be able to avoid dangers on the road and the motorcycle 1 should therefore preferably be in a safe position in the roadway. Given that the video sensor is able to determine the boundaries 5 of the lane 2, this information can be used to ascertain which sub-lanes 4 (sub-sections of the lane 2) can be selected. In order to achieve this, a method according to exemplary embodiments of the present invention can ascertain the width of the lane 2 and determine two, in particular three, sub-lanes 4, for example left, middle and right.

Taking into account the smaller size of the motorcycle 1, it may be advantageous to ascertain sub-sections, or sub-lanes 4, of the road in order to improve accident prevention algorithms, comfortable driving algorithms, and the associated functions.

Smaller, motorcycle-specific lanes 2 in the current lanes 2 in particular make new motorcycle-oriented comfort and safety functions, such as hazard avoidance, group riding or cornering recommendations, possible. In addition, the existing comfort and safety functions can be adapted to two-wheelers in order to provide similar performance to the new functions.

A possible sequence of a method according to an exemplary embodiment is described below. In a first step, the width of the ego lane can be ascertained depending on the recognized boundaries 5 of the lane 2 and can be updated on the basis of the following criteria. If only one boundary 5 is recognized, the sought width is preferably reduced to a standard lane width (for example 3.5 m). If both boundaries 5 are recognized, the ascertained width is in particular updated accordingly. If no boundary 5 is recognized, the ascertained width is preferably reduced to the standard lane width. In a further step, a distance to the nearest boundary 5 is preferably calculated. Subsequently, in a further step, a width of the at least two, in particular three, sub-lanes 4 can be ascertained. In a further step, the position in the lane 2 can be calculated on the basis of the width and position of the lateral deviation of the motorcycle 1 from the boundary 5. In a further step, a last position of motorcycle 1 in the lane 2 can be updated in order to make tracking of past positions possible.

FIGS. 3 to 7 show various advantageous possible applications of the method according to exemplary embodiments.

Figure 3:
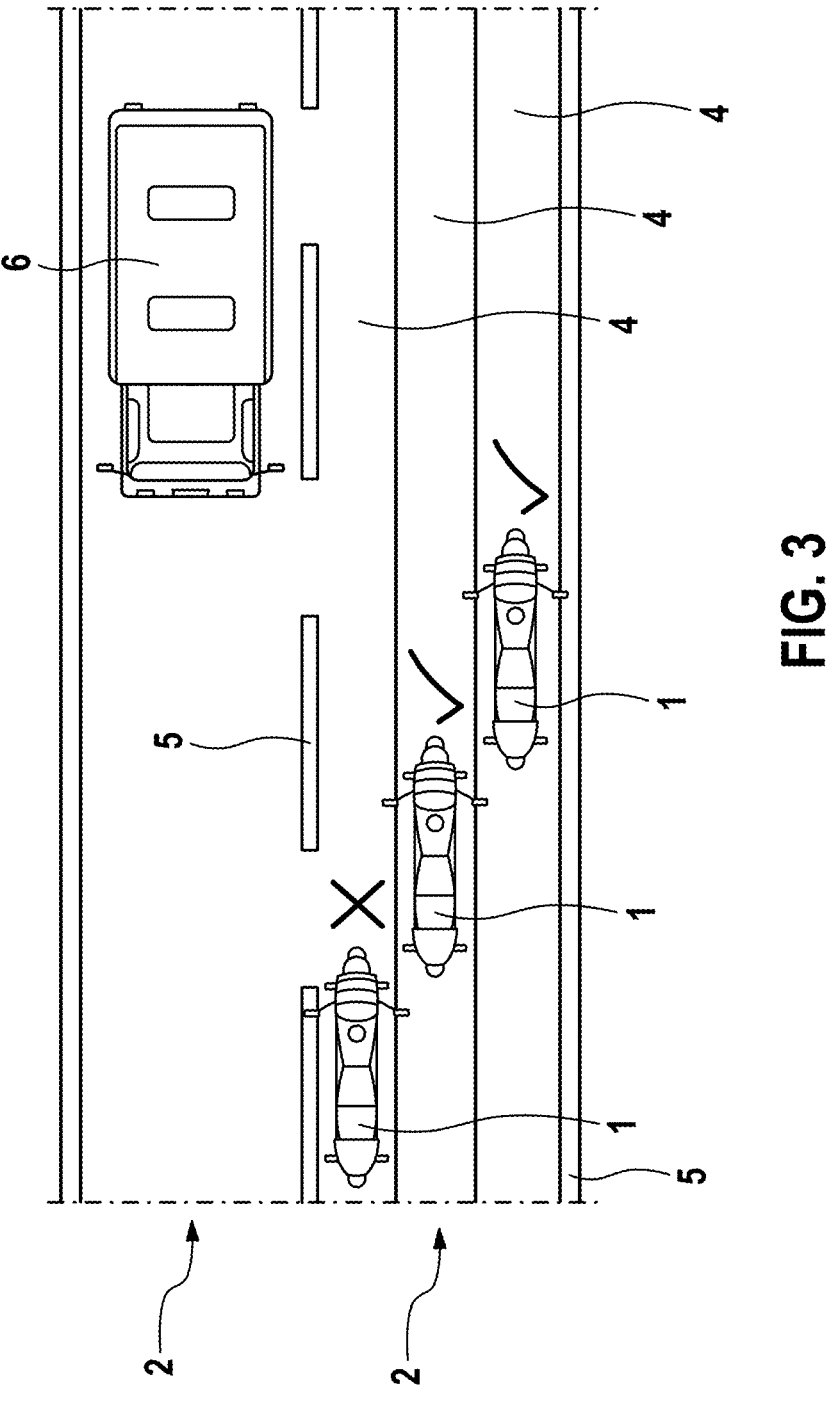
FIG. 3 shows a possible application scenario of the method with a truck according to exemplary embodiments of the present invention.

FIG. 3 shows two lanes 2. In the lower lane 2, three possible sub-lanes 4 for the vehicle 1, preferably motorcycle 1, are shown. An obstacle 6, in this case a truck, is shown in the upper lane 2. Due to the presence of the obstacle 6 in the upper lane 2, the middle and lower sub-lanes 4 are preferably the recommended sub-lanes 4 since the left sub-lane 4 could pose a risk to the driver of the vehicle 1 due to the obstacle 6. Furthermore, in the lane 2 in which the vehicle 1 is located, central roadway markings and an outer continuous roadway marking are shown, which markings may be a boundary 5 according to the method. For example, if the vehicle 1 is in the left sub-lane 4, the central roadway markings are the nearest boundary.

Figure 4:
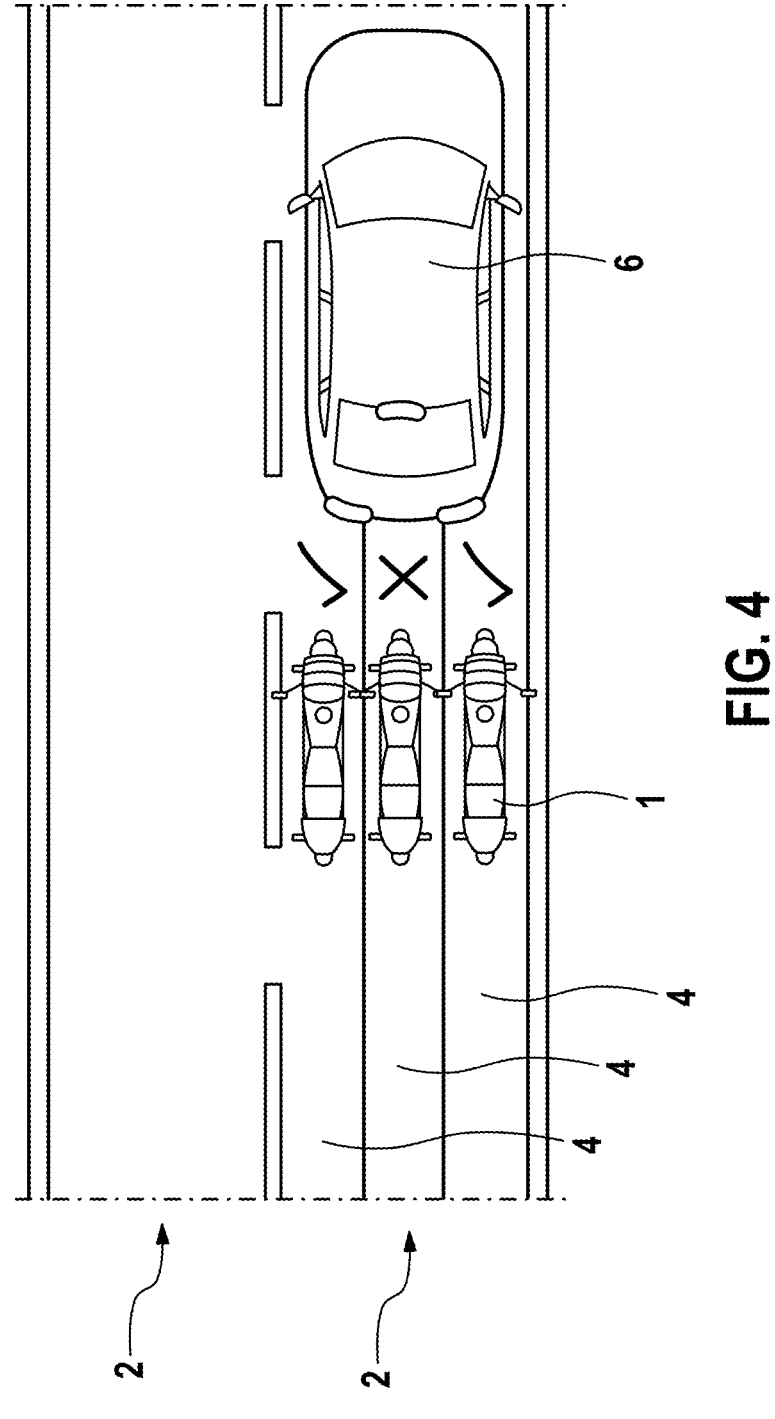
FIG. 4 shows a further possible application scenario of the method with a passenger car according to exemplary embodiments of the present invention.

FIG. 4 shows a further scenario with two lanes 2. In this case, there is an obstacle 6 in the form of a passenger car in the same lane 2 as the vehicle 1. In this case, due to the obstacle 6, the right and left sub-lanes 4 may be the recommended sub-lanes 4 since the middle sub-lane 4 could pose a risk to the driver of the vehicle 1 due to the obstacle 6.

Figure 5:
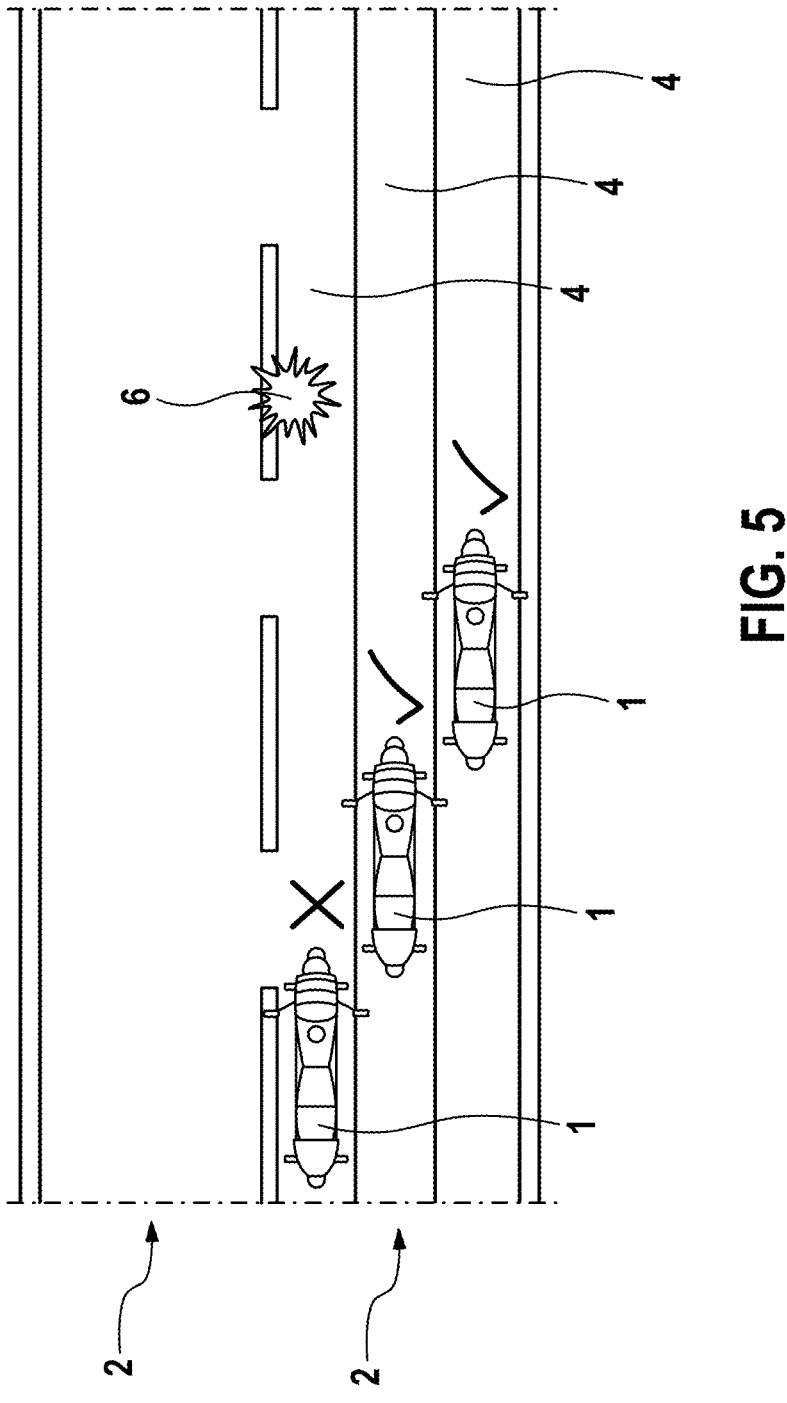
FIG. 5 shows a further possible application scenario of the method with an oil stain according to exemplary embodiments of the present invention.

FIG. 5 shows a further scenario with two lanes 2. In this case, an obstacle 6 in the form of an oil stain is present in the left sub-lane 4. Accordingly, the middle and right sub-lanes 4 can be the recommended sub-lanes 4 for the vehicle 1 here.

Figure 6:
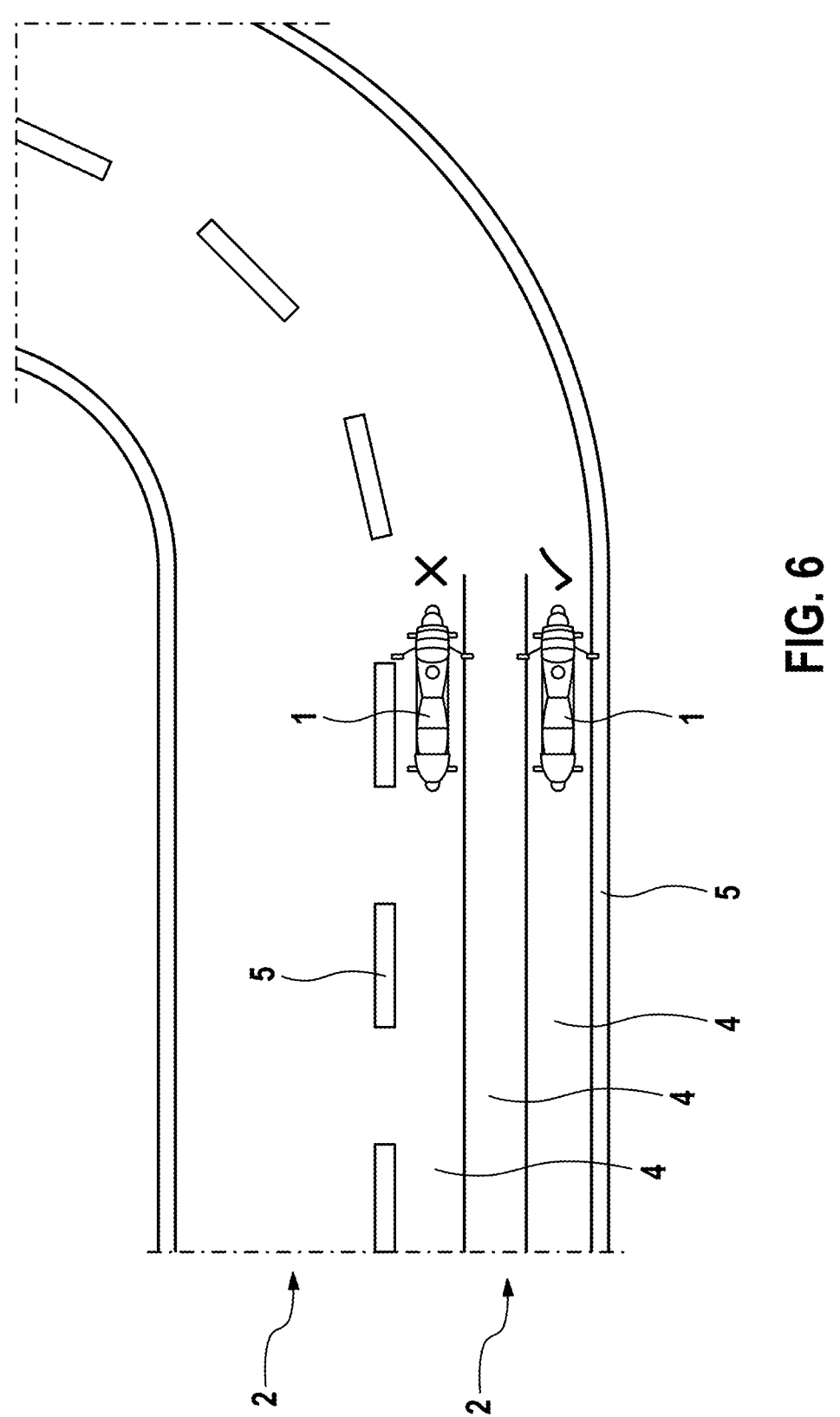
FIG. 6 shows a further possible application scenario of the method with cornering according to exemplary embodiments of the present invention.

FIG. 6 shows a further scenario with two lanes 2. This is a left turn, which is why the outer, i.e., the right, sub-lane 4 may be the recommended sub-lane 4 for the vehicle 1. Here, one boundary 5 is the outer roadway edge and a further possible boundary 5 is the central roadway markings.

Figure 7:
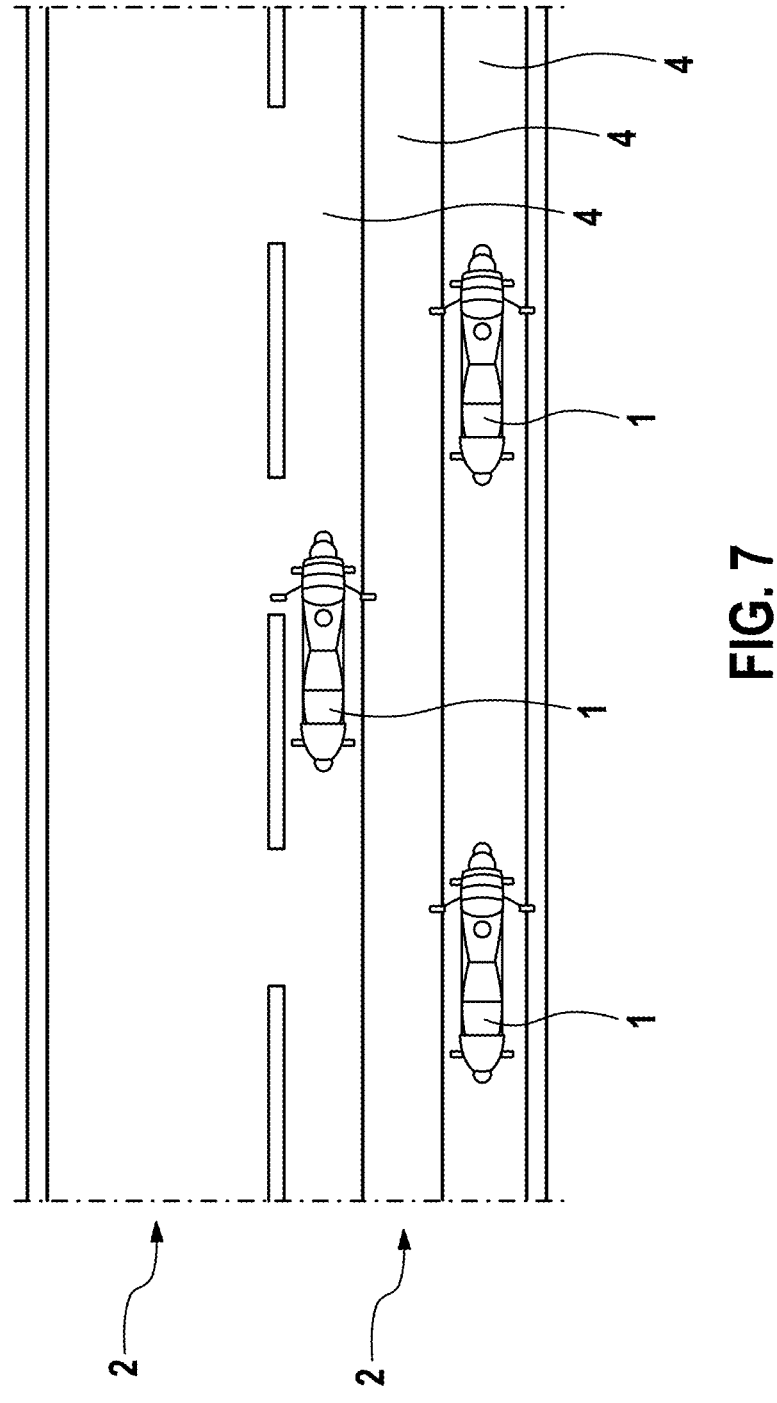
FIG. 7 shows a further possible application scenario of the method with a group ride according to exemplary embodiments of the present invention.

FIG. 7 shows a further scenario with two lanes 2. Here, multiple vehicles 1, in particular motorcycles 1, are in the lower lane 2. In order to ensure safe driving, it may be provided that vehicles 1 driving one behind the other are in each case located in an opposite sub-lane 4. In simpler terms, the sub-lanes 4 recommended for the particular vehicles 1 can always alternately be the left and the right sub-lane 4.

The above description of the embodiments describes the present invention exclusively in the context of examples. Of course, individual features of the embodiments, provided they make technical sense, can be freely combined with one another without departing from the scope of the present invention.

What is claimed is:

1. A method for ascertaining a position of a vehicle within a lane, comprising the following steps:

providing image data, wherein the image data result from a recording by at least one camera of the vehicle;

analyzing the image data in order to determine a width of the lane and a distance of the vehicle to a nearest boundary of the lane;

determining at least two sub-lanes in the lane based on the determined width of the lane and the nearest boundary of the lane;

ascertaining the position of the vehicle with respect to one of the at least two determined sub-lanes based on the width of the lane and the distance of the vehicle to the nearest boundary of the lane;

ascertaining a recommended sub-lane based on an analysis of the image data with regard to a current driving scenario; and initiating an outputting of a warning to a driver of the vehicle when the vehicle is in a sub-lane other than the recommended sub-lane, wherein the warning indicates the recommended sub-lane.

2. The method according to claim 1, wherein the at least two sub-lanes include at least three sub-lanes, wherein the at least three sub-lanes have a same width.

3. The method according to claim 1, further comprising the following steps:

detecting at least one boundary of the lane based on the analysis of the image data;

defining the width of the lane based on a specification when only one boundary of the lane has been detected; and calculating the width of the lane based on the analysis of the image data when two boundaries of the lane have been detected.

4. The method according to claim 1, wherein the warning is output in a human-machine user interface visually and/or acoustically.

5. The method according to claim 1, further comprising the following step:

ascertaining a free space in front of the vehicle in the lane based the analysis of the image data with regard to the current driving scenario;

wherein the recommended sub-lane is ascertained taking into account the ascertained free space in front of the vehicle.

6. The method according to claim 1, wherein the recommended sub-lane is ascertained taking into account a current velocity of the vehicle.

7. A device for data processing configured to ascertain a position of a vehicle within a lane, the device configured to:

provide image data, wherein the image data result from a recording by at least one camera of the vehicle;

analyze the image data in order to determine a width of the lane and a distance of the vehicle to a nearest boundary of the lane;

determine at least two sub-lanes in the lane based on the determined width of the lane and the nearest boundary of the lane;

ascertain the position of the vehicle with respect to one of the at least two determined sub-lanes based on the width of the lane and the distance of the vehicle to the nearest boundary of the lane;

ascertain a recommended sub-lane based on an analysis of the image data with regard to a current driving scenario; and initiate an outputting of a warning to a driver of the vehicle when the vehicle is in a sub-lane other than the recommended sub-lane, wherein the warning indicates the recommended sub-lane.

8. A non-transitory computer-readable storage medium on which is stored a computer program including commands for ascertaining a position of a vehicle within a lane, the commands, when executed by a computer, causing the computer to perform the following steps:

providing image data, wherein the image data result from a recording by at least one camera of the vehicle;

analyzing the image data in order to determine a width of the lane and a distance of the vehicle to a nearest boundary of the lane;

determining at least two sub-lanes in the lane based on the determined width of the lane and the nearest boundary of the lane;

ascertaining the position of the vehicle with respect to one of the at least two determined sub-lanes based on the width of the lane and the distance of the vehicle to the nearest boundary of the lane;

ascertaining a recommended sub-lane based on an analysis of the image data with regard to a current driving scenario; and initiating an outputting of a warning to a driver of the vehicle when the vehicle is in a sub-lane other than the recommended sub-lane, wherein the warning indicates the recommended sub-lane.

* * * * *